United States Patent
Kusunoki

(10) Patent No.: US 9,118,363 B2
(45) Date of Patent: Aug. 25, 2015

(54) TIMING SYNCHRONIZATION SYSTEM FOR MIMO-OFDM

(71) Applicant: SONY MOBILE COMMUNICATIONS INC., Tokyo (JP)

(72) Inventor: Shigeo Kusunoki, Kanagawa (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 0 days.

(21) Appl. No.: 13/963,351

(22) Filed: Aug. 9, 2013

(65) Prior Publication Data
US 2014/0056373 A1 Feb. 27, 2014

Related U.S. Application Data

(60) Provisional application No. 61/693,349, filed on Aug. 27, 2012.

(51) Int. Cl.
| | |
|---|---|
| *H04B 7/005* | (2006.01) |
| *H04B 7/04* | (2006.01) |
| *H04L 27/26* | (2006.01) |
| *H04J 11/00* | (2006.01) |
| *H04L 5/00* | (2006.01) |
| *H04L 25/02* | (2006.01) |

(52) U.S. Cl.
CPC .......... *H04B 7/0413* (2013.01); *H04L 27/2605* (2013.01); *H04L 27/2656* (2013.01); *H04L 5/0023* (2013.01); *H04L 25/0204* (2013.01); *H04L 25/0228* (2013.01)

(58) Field of Classification Search
CPC ............ H04L 27/2656; H04L 27/2613; H04L 27/2675; H04L 27/2655; H04L 27/2692; H04L 5/0048; H04L 25/0228; H04L 25/0204; H04B 2201/70701; H04B 7/0413; H04W 56/00; H04W 56/0005; H04W 56/0075
USPC ......... 370/350, 503, 512, 345, 310, 509, 498, 370/464; 375/354, 368, 346, 347, 349, 316
See application file for complete search history.

(56) References Cited

U.S. PATENT DOCUMENTS

| | | | | |
|---|---|---|---|---|
| 2006/0072681 | A1* | 4/2006 | Goel et al. | 375/267 |
| 2007/0183518 | A1* | 8/2007 | Ma et al. | 375/260 |

(Continued)

FOREIGN PATENT DOCUMENTS

JP   2006-238367   9/2006

*Primary Examiner* — Chieh M Fan
*Assistant Examiner* — Michelle M Koeth
(74) *Attorney, Agent, or Firm* — Oblon, McClelland, Maier & Neustadt, L.L.P.

(57) ABSTRACT

A communication system including a transmission device having a plurality of transmission antennas that transmit a plurality of signals under a multiple input multiple output (MIMO) scheme; and a reception device having a plurality of reception antennas that receive the plurality of signals under the MIMO scheme. The transmission device is configured to add a preamble signal to a transmission signal transmitted to the reception device at an earliest timing among transmission signals that are modulated under an orthogonal frequency division multiplexing (OFDM) scheme, the transmission signals being output from the transmission antennas. The transmission device does not add the preamble signal to the transmission signals other than the transmission signal transmitted at the earliest timing.

5 Claims, 8 Drawing Sheets

(56) References Cited

U.S. PATENT DOCUMENTS

| | | | |
|---|---|---|---|
| 2010/0329366 A1* | 12/2010 | Wang et al. | 375/259 |
| 2011/0193739 A1* | 8/2011 | Strauch et al. | 342/146 |
| 2011/0312316 A1* | 12/2011 | Baldemair et al. | 455/422.1 |
| 2012/0243638 A1* | 9/2012 | Maltsev et al. | 375/316 |
| 2014/0146862 A1* | 5/2014 | Aubert | 375/224 |

* cited by examiner

TIMING SYNCHRONIZATION SYSTEM FOR MIMO-OFDM

CROSS REFERENCE TO RELATED APPLICATIONS

This application is related to and claims priority under 35 U.S.C. §119(e) to Provisional Application Ser. No. 61/693,349, filed Aug. 27, 2012, the contents of which are hereby incorporated herein by reference.

BACKGROUND

1. Field

The present disclosure relates to a communication system to wirelessly transmit a signal modulated under an OFDM (Orthogonal Frequency Division Multiplexing) scheme, a communication device to which the communication system is applied, and a reception device to receive the wirelessly transmitted signal.

2. Description of the Related Art

In recent years, high-speed communications such as LTE (Long Term Evolution), WiMAX (Worldwide Interoperability for Microwave Access), etc. based on a modulation scheme using OFDM have been put to practical use. OFDM has guard intervals and therefore is highly usable in frequency selective multipath, and the implementation of MIMO (multiple-input and multiple-output) is easier in OFDM than in other modulation schemes. That is, since FFT (Fast Fourier Transform) allows signal processing in a frequency domain to be performed easily, the estimation of a complex channel matrix and the signal separation can be facilitated. Further, multiuser MIMO (MU-MIMO) establishing communications between a single base station and many terminals using the same frequency is considered as its applied technology.

Although MIMO is targeted only for communications from the base station side, that is, downlink at present, researches are being conducted to apply MIMO to transmission from a mobile terminal (uplink) in the future. According to MIMO, high-speed communication is realized by transmitting different signals in parallel from plural antennas, which is, however, based on the premise that there are no delays between all signals and exact temporal agreement is achieved therebetween. In a base station, the agreement can be realized by implementing high-precision hardware. However, when performing MIMO transmission from a mobile terminal, it is difficult to attain accurate temporal agreement for each of plural transmission paths in the terminal. Highly precise synchronization techniques cannot be introduced into a mobile terminal because of its limited size and power consumption. Further, in the case of MU-MIMO, it is difficult to perform MIMO transmission due to a relative delay between terminals occurring in transmission.

For the OFDM reception, there is a need to detect the FFT frame with accuracy. The circumstances where the frame detection is erroneously performed will be considered. When FFT is performed earlier than the original start of a frame and the original start point of the frame is inside a guard interval, the orthogonality of subcarriers after the FFT is retained. However, the guard interval length is reduced and it becomes impossible to avoid desired multipath. On the other hand, when the time of starting FFT is later than the original start point of the frame, an intersymbol interference occurs in the signal stream tail part and the orthogonality between subcarriers is not retained.

Accordingly, many ideas are implemented to acquire synchronization in a receiver. FIG. 1 illustrates a reception device 10 receiving MIMO transmission by applying a modulation scheme using OFDM.

The reception device 10 of FIG. 1 has two reception paths of a path #0 and a path #1. The reception path of the path #0 includes a high frequency unit (hereinafter referred to as an "RF unit") 12a to which an antenna 11a is connected. A signal received with the RF unit 12a is converted into digital data with an analog-to-digital converter 13a. The data converted with the analog-to-digital converter 13a is supplied to a correlation detection unit 15 via a matched filter 14a configured to detect a preamble. The correlation detection unit 15 detects the head position (synchronization point) of an FFT frame through auto-correlation or cross-correlation. A guard interval elimination unit 16a eliminates a guard interval from a received FFT frame based on the head of the FFT frame, which is detected with the correlation detection unit 15.

Data from which the guard interval is eliminated with the guard interval elimination unit 16a is supplied to an FFT unit 17a, data modulated into individual subcarriers with the FFT unit 17a is retrieved, and the retrieved reception data of the path #0 is supplied to a reception data processing unit 18.

As for the reception path of the path #1, the configuration is the same as that of the reception path of the path #0. That is, a signal received with an RF unit 12b to which an antenna 11b is connected is supplied to an analog-to-digital converter 13b, a matched filter 14b, the correlation detection unit 15, a guard interval elimination unit 16b, and an FFT unit 17b in sequence, and reception data of the path #1 is supplied to the reception data processing unit 18.

In Patent Literature 1, detection of the head of an FFT frame through an auto-correlation operation and a cross-correlation operation is disclosed.

CITATION LIST

Patent Literature

[PTL 1] Japanese Unexamined Patent Application Publication No. 2006-238367

As illustrated in FIG. 1, in the case of the reception device for MIMO, there is a necessity to collect the signals of individual reception branches to perform the operation of auto-correlation or cross-correlation with the correlation detection unit 15. Processing of this kind is performed based on the premise that both the times and the frequencies of signals that are transmitted from plural antennas on the transmission side exactly agree with one another.

However, when an MIMO transmission is performed on the uplink in the future, it is assumed that there will be the circumstances where the accuracy of times or frequencies cannot be ensured between signals that are transmitted from the plural antennas on the transmission side. That is, when a mobile terminal performs the MIMO transmission, transmission signals that are output from a transmission data processing system in the mobile terminal may have respective delays before reaching the antennas of individual channels, which prevent synchronization between the antennas. Factors responsible for the respective delays include the difference between the group delays of power amplifiers, the difference between the group delays of transmission bandpass filters, and the difference between the group delays of various notch filters and matching circuits.

For example, there are differences between the group delays of power amplifiers due to the differences between active elements constituting the amplifiers. Although the power amplifiers have the same configuration, there are further differences between group delays depending on a temperature or an applied voltage. When there are two antennas, a group delay difference of a few nsec occurs.

The transmission bandpass filter has a group delay of about 10 nsec, which is significantly dependent on a pass band or an ambient temperature.

Whether or not the various notch filters should be installed on individual paths is determined according to the respective circumstances, although significantly depending on the performances of parts to be used, to reduce components interfering with other bands. The matching circuits are installed in consideration of the characteristics of elements to satisfy the characteristics between the elements. The circuit configuration and number of parts thereof are variable, and it is often necessary to provide two paths having different configurations. Recovery from this kind of delays can be achieved by performing phase correction when the delay amounts are obtained in advance. However, the delay amount of a mobile terminal usually varies from terminal to terminal. Further, it is difficult to estimate the delay amount due to its fluctuation with temperature and fluctuation over time.

Further, when an MIMO transmission is performed on the uplink, a problem occurs when channel estimation is performed. According to MIMO, a channel is represented by a determinant (hereinafter referred to as an "H-matrix".). The H-matrix is estimated based on pilots that are provided in transmission signals, and signals are separated. However, when the displacement of a FFT frame occurs between the transmission signals due to a relative delay, fixation on any single point causes the problem of incorrect demodulation of the pilot. The pilots are arranged so that the frequencies and the time ranges of OFDM do not overlap one another between plural transmission paths. Therefore, if each of FFT frames where the pilots are arranged can be specified in some way, the pilots can be correctly found out.

That is, when there are two paths of the reception path #0 and the reception path #1 as illustrated in FIG. 2, FFT frames where the pilots are arranged are in different timings. GI denotes a guard interval. In this example, a relative delay of about 4 nsec occurs between two reception paths #0 and 1 when signals are transmitted from the transmission side. On the reception path #0, a section a where a pilot signal has been transmitted is detected, and demodulation is performed in synchronization with the timing. Further, on the reception path #1, a section b where a pilot signal has been transmitted is also detected, and demodulation is performed in synchronization with the timing. The transmission signals of this example are signals modulated with QPSK.

When performing receptions as illustrated in FIG. 2, MIMO channels are expressed in matrix form as illustrated at the lower left of FIG. 3. h00 and h01 are estimated from the path #0, and h10 and h11 are estimated from the path #1. At that time, a time delay occurring between the two paths does not affect a reception pilot due to the processing of frame synchronization. Here, the data reception begins, and pieces of data of the two paths temporally overlap each other during transmission. The pieces of data are demodulated by separating signals of the two paths by the use of an inverse matrix of the previously obtained H-matrix. At that time, however, the pieces of reception data of the two paths include a delay δ between the paths as illustrated in FIG. 2. Therefore, the demodulation is performed with the phase shift, which interferes with the proper signal separation. That is, the separation of signals including the delay δ is performed by the use of the H-matrix which is not affected by the delay δ.

FIGS. 4A and 4B illustrate exemplary constellations that are obtained as a result of the reception and demodulation. FIG. 4A illustrates a case of an ideal reception state. In the ideal state, reception symbols are fixed into four positions. On the other hand, when the separation of the signals including the delay δ is performed, the positions of reception symbols are not fixed and the demodulation ends in failure.

The inventor recognizes the need for performing correct reception even though a relative delay occurs when a MIMO transmission is performed.

BRIEF SUMMARY

According to a communication system of the present disclosure, a preamble signal is added to a transmission signal transmitted in the earliest timing among transmission signals that are modulated under an OFDM scheme, the transmission signals being output from individual transmission antennas under an MIMO scheme.

The preamble signal is not added to the transmission signals except the transmission signal transmitted in the earliest timing.

Further, a communication device of the present disclosure includes a transmission signal processing unit that adds a preamble signal to a transmission signal transmitted in an earliest timing among plural transmission signals that are modulated under an OFDM scheme, the transmission signals being simultaneously transmitted under an MIMO scheme, and that does not add the preamble signal to the other transmission signals. The communication device includes a transmission antenna that separately transmits each of plural transmission signals that are generated by the transmission signal processing unit.

Further, a reception device of the present disclosure includes plural reception antennas that receive plural signals that are modulated under an OFDM scheme, the signals being simultaneously transmitted under an MIMO scheme, a synchronization processing unit that acquires a synchronization acquisition signal from a reception signal, and a reception processing unit that performs reception in a timing determined based on the synchronization acquisition signal.

The synchronization processing unit determines a frame synchronization signal acquired from a preamble signal included in a specific reception signal received in an earliest timing among the signals that are received by the plural reception antennas to be the synchronization acquisition signal.

The reception processing unit performs frame synchronization processing for a signal received by each of the reception antennas based on the synchronization acquisition signal acquired with the synchronization processing unit.

According to the present disclosure, signals of individual channels are properly received by respective reception paths on the reception side, even if a relative delay occurs between transmission signals that are simultaneously transmitted under a MIMO scheme.

BRIEF DESCRIPTION OF THE DRAWINGS

FIG. 4A is a characteristic diagram illustrating an ideal reception state of MIMO. FIG. 4B is a characteristic diagram illustrating a reception state of MIMO, which is attained when a channel includes a transmission delay.

DETAILED DESCRIPTION

Hereinafter, an exemplary embodiment of the present disclosure will be described with reference to FIG. 5 to FIG. 11 in the following order.
1. Example of MIMO transmission device (FIG. 5)
2. Example of transmission signal (FIG. 6)
3. Example of MIMO reception device (FIG. 7)
4. Example of MIMO reception device: Example where frame synchronization of each path is switched (FIG. 8)
5. Example of frame synchronization unit (FIG. 9)
6. Example of channel estimation (FIG. 10 and FIG. 11)
7. Example of modification

1. EXAMPLE OF MIMO TRANSMISSION DEVICE

Figure 1:
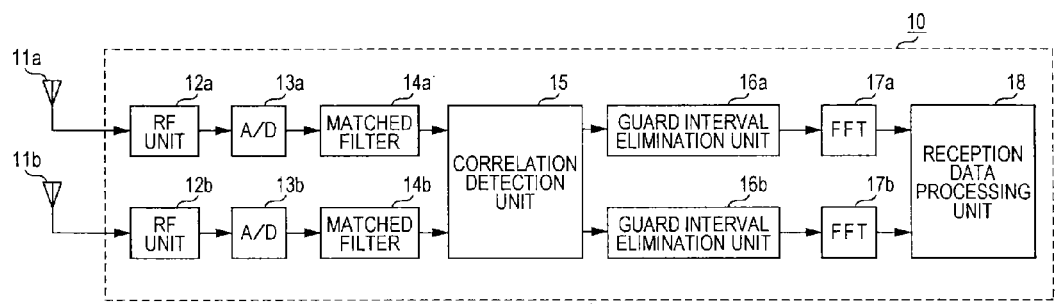
FIG. 1 is a block diagram illustrating an exemplary MIMO reception device according to related art.
Figure 2:
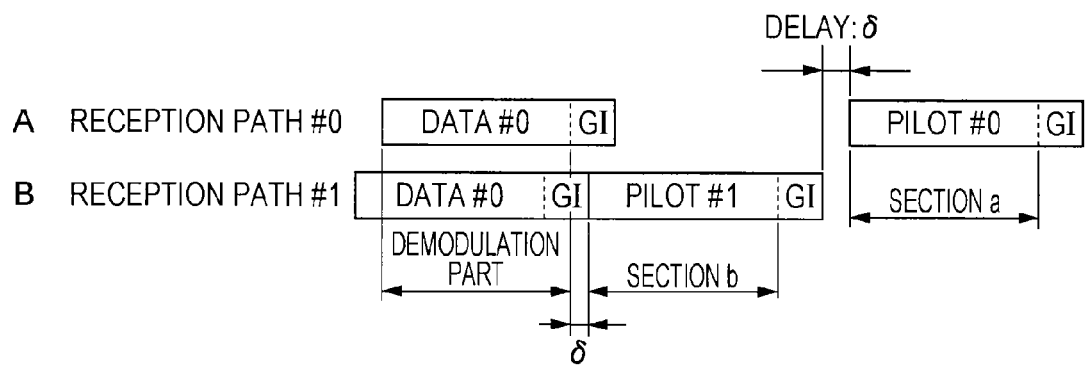
FIG. 2 is a diagram illustrating an exemplary transmission state of MIMO.
Figure 3:
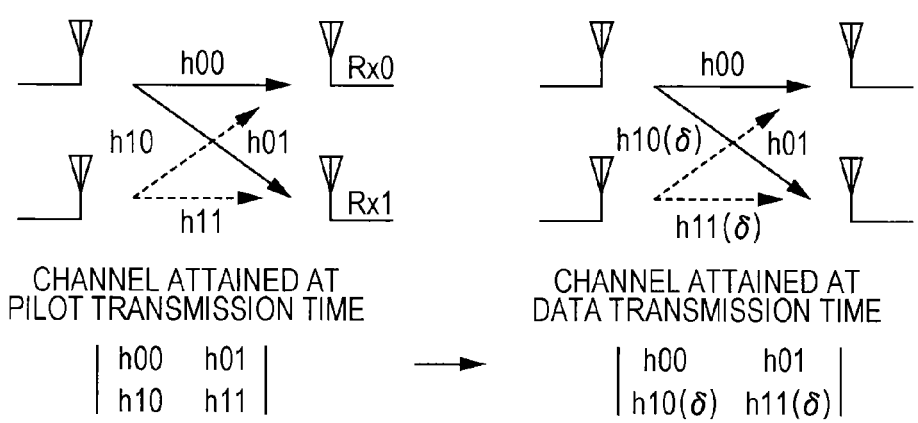
FIG. 3 is a diagram illustrating an exemplary channel estimation of MIMO.
Figure 4A:
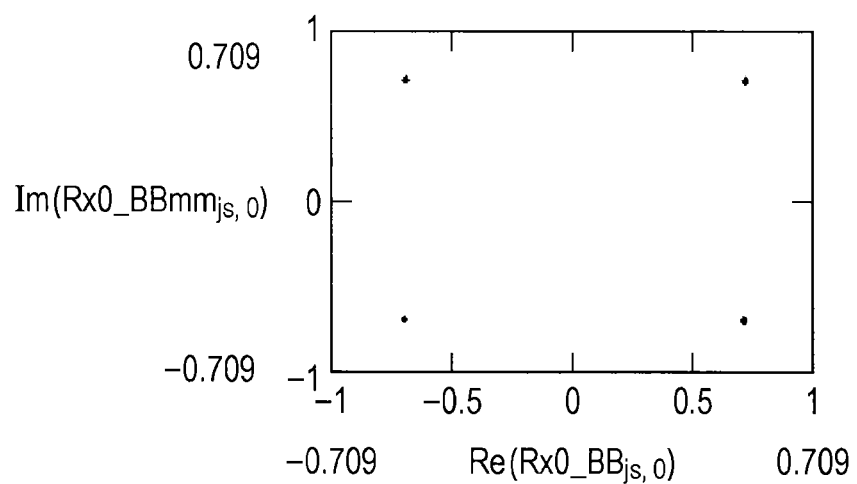
FIGS. 4A and 4B are characteristic diagrams illustrating a reception state of MIMO.
Figure 4B:
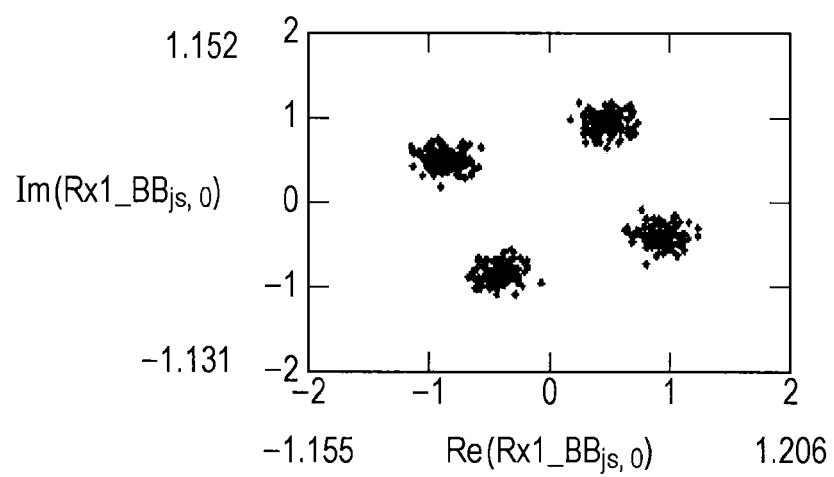
Figure 5:
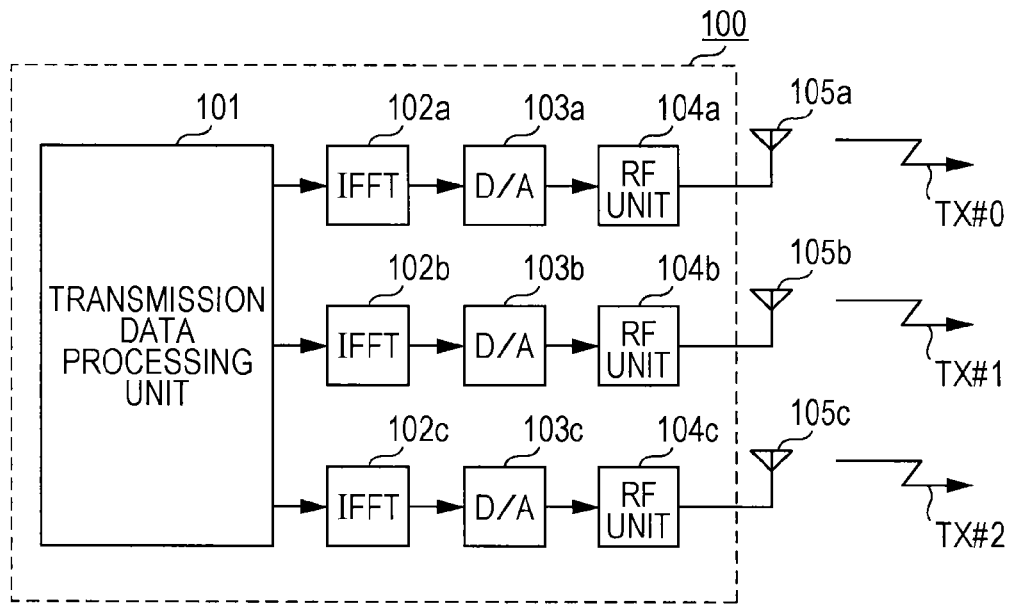
FIG. 5 is a block diagram illustrating an exemplary MIMO transmission device according to an embodiment of the present disclosure.

FIG. 5 is a diagram illustrating an example of a MIMO transmission device which is a communication device of the present disclosure.

A MIMO transmission device 100 illustrated in FIG. 5 includes a transmission data processing unit 101. The transmission data processing unit 101 performs processing to generate transmission data of plural channels. In the example of FIG. 5, the transmission data processing unit 101 generates three pieces of transmission data. Note that, generating the three pieces of transmission data is an example, and two or four or more pieces of transmission data may be generated.

Transmission data for individual paths, which are output from the transmission data processing unit 101, are supplied to IFFT units 102a, 102b, and 102c, and are subjected to inverse Fourier transform. Signals subjected to the inverse Fourier transform in the IFFT units 102a, 102b, and 102c are supplied to RF units (high frequency units) 104a, 104b, and 104c via digital-to-analog converters 103a, 103b, and 103c. Transmission signals that are converted into specified transmission frequencies with the RF units 104a, 104b, and 104c are wirelessly transmitted from antennas 105a, 105b, and 105c.

For example, a transmission signal TX #0 is wirelessly transmitted from the antenna 105a, and a transmission signal TX #1 is wirelessly transmitted from the antenna 105b. Further, a transmission signal TX #2 is wirelessly transmitted from the antenna 105c. The transmission signals TX #1 and TX #2 are wirelessly transmitted in the same frequency band.

Here, the MIMO transmission device 100 according to an example of the present disclosure adds a preamble signal only to transmission data with the smallest relative delay for processing performed with a transmission processing system among the three pieces of transmission data generated with the transmission data processing unit 101. The transmission data processing unit 101 does not add the preamble signal to the rest of the transmission data. The transmission data processing unit 101 adds a null signal which is an invalid transmission signal to a section where the preamble signal is not added.

A transmission processing system with the smallest relative delay is determined by measuring the property of each of transmission processing systems in advance, for example.

2. EXAMPLE OF TRANSMISSION SIGNAL

Figure 6:
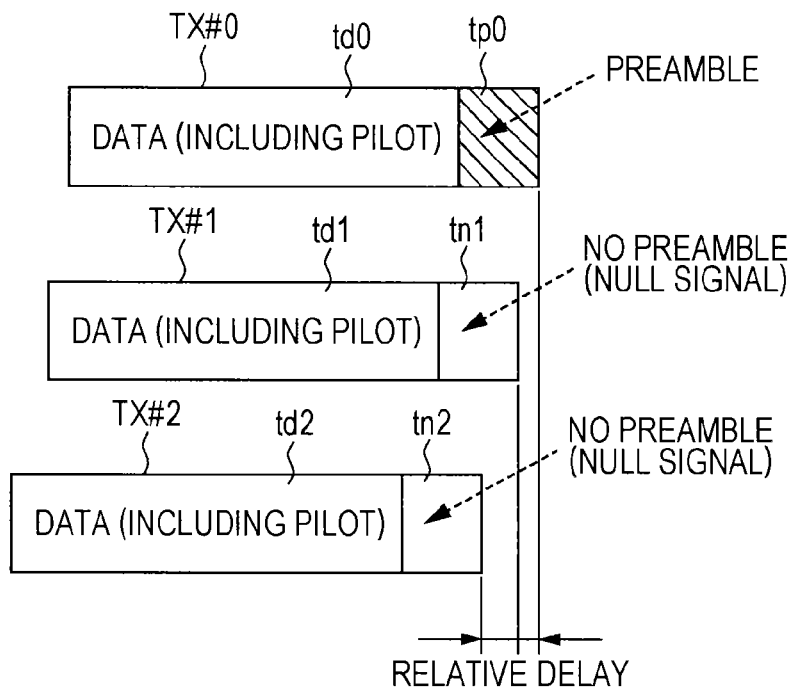
FIG. 6 is a diagram illustrating an exemplary transmission state according to an embodiment of the present disclosure.

FIG. 6 is a diagram illustrating the transmission states of the three transmission signals TX #0, TX #1, and TX #2.

Each of the transmission signals TX #0, TX #1, and TX #2 is transmitted as an OFDM-modulated OFDM frame. In an example of the present disclosure, a preamble signal tp0 is added only to the transmission signal TX #0 with the smallest relative delay (that is, transmitted earliest) among the three transmission signals TX #0 to TX #2. In sections tn1 and tn2 to which the preamble signals of the transmission signals TX #1 and TX #2 that are transmitted later than the transmission signal TX #0 are to be added, null signals that are invalid transmission signals are arranged. Real data or a pilot signal is arranged in a section other than the preamble signal provided in one OFDM frame.

The preamble signal is provided to detect synchronization timing on the reception side. That is, on the reception side, processing including preparing a preamble replica signal having the same pattern as that of the preamble signal, detecting the correlation between a reception signal and the preamble replica signal, and detecting the timing of transmission of the preamble signal.

Although the section where the preamble signal tp0 is arranged, which is provided in the transmission signal TX #0, is determined to be the head part of an OFDM frame in FIG. 6, it is not necessarily the head part. For example, the preamble signal or the null signal may be arranged in substantially the center part of an OFDM frame.

Note that, the pilot signal is used to estimate a transmission channel or to measure the state of each subcarrier during the channel estimation processing performed on the reception side. The channel estimation processing is performed after a fast Fourier transform is performed. The pilot signal is transmitted in timing which is varied among transmission paths.

3. EXAMPLE OF MIMO RECEPTION DEVICE

Next, a MIMO reception device 200 receiving a signal transmitted from the MIMO transmission device 100 will be described.

Figure 7:
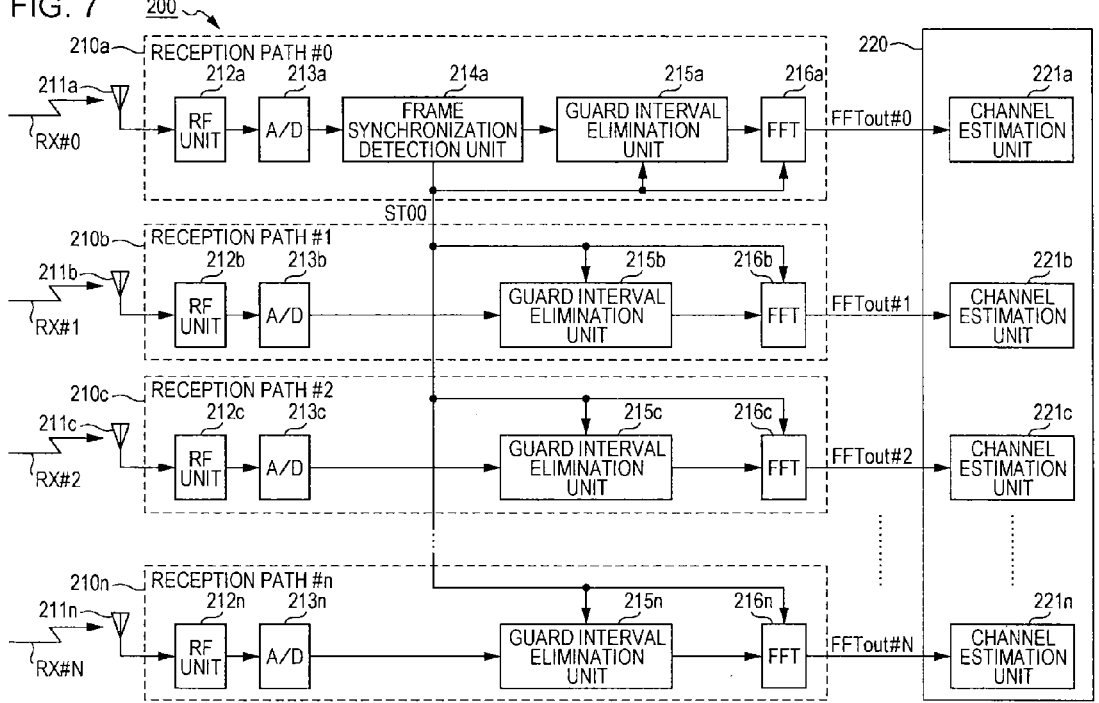
FIG. 7 is a block diagram illustrating an exemplary MIMO reception device according to an embodiment of the present disclosure.

FIG. 7 is a diagram illustrating an example of the MIMO reception device 200. The MIMO reception device 200 includes n+1 (n is any integer) reception paths 210a to 210n designated by #0 to #n.

An explanation for the reception path 210a designated by #0 will be given. An RF unit 212a to which an antenna 211a is connected receives a signal of a specified frequency band. The reception signal acquired with the RF unit 212a is supplied to an analog-to-digital converter 213a, and is converted into digital data. Reception data output from the analog-to-digital converter 213a is supplied to a frame synchronization detection unit 214a that performs processing to detect a preamble signal included in the reception signal, and that outputs a frame synchronization signal indicating the transmission timing of one OFDM frame.

The reception data output from the frame synchronization detection unit 214a is supplied to a guard interval elimination unit 215a, and the section of a guard interval, which is provided in one OFDM frame, is eliminated. The reception data from which the guard interval is eliminated with the guard interval elimination unit 215a is supplied to an FFT unit 216a, and data modulated into subcarriers is retrieved. The timing of eliminating the guard interval with the guard interval elimination unit 215a and the start timing of a fast Fourier operation performed with the FFT unit 216a are determined based on a frame synchronization signal output from the frame synchronization detection unit 214a. The reception data acquired with the FFT unit 216a is supplied to a reception signal processing unit 220 that includes a channel estimation unit 221a and that performs processing to estimate a transmission channel.

Concerning the reception paths 210b to 210n designated by #1 to #n, RF units 212b to 212n to which their respective antennas 211b to 211n are connected receive signals of the specified frequency band. The respective reception signals are supplied to analog-to-digital converters 213b to 213n and converted into digital data. Reception data output from the analog-to-digital converters 213b to 213n is supplied to the guard interval elimination units 215b to 215n. In the guard interval elimination units 215b to 125n of the reception paths 210b to 210n designated by #1 to #n, processing to eliminate a guard interval is performed with reference to a frame synchronization signal output from the frame synchronization detection unit 214a of the reception path 210a designated by #0. Further, reception data output from the respective guard interval elimination units 215b to 215n is supplied to FFT units 216b to 216n, and data modulated into subcarriers is retrieved. The start timing of fast Fourier operations that are performed with the FFT units 216b to 216n of the reception paths 210b to 210n designated by #1 to #n is determined based on the frame synchronization signal output from the frame synchronization detection unit 214a of the reception path 210a designated by #0. The reception data acquired with the FFT units 216b to 216n is supplied to the reception signal processing unit 220 that includes channel estimation units 221b to 221n that are provided for the respective reception paths, and that performs processing to estimate transmission channels.

In the MIMO reception device 200 illustrated in FIG. 7, each of the reception paths 210a to 210n designated by #0 to #n separately performs reception processing on a corresponding one of reception signals RX#0 to RX#n. According to the MIMO reception device 200 illustrated in FIG. 7, even if a signal including the preamble signal which is only included in the transmission signal of one of plural paths is received as illustrated in FIG. 6, reception processing can be appropriately performed for the signals of individual channels. However, the MIMO reception device 200 illustrated in FIG. 7 may perform the reception processing for the reception signals of individual channels, the reception signals including the preamble signals.

4. EXAMPLE OF MIMO RECEPTION DEVICE: EXAMPLE WHERE FRAME SYNCHRONIZATION OF EACH PATH IS SWITCHED

Figure 8:
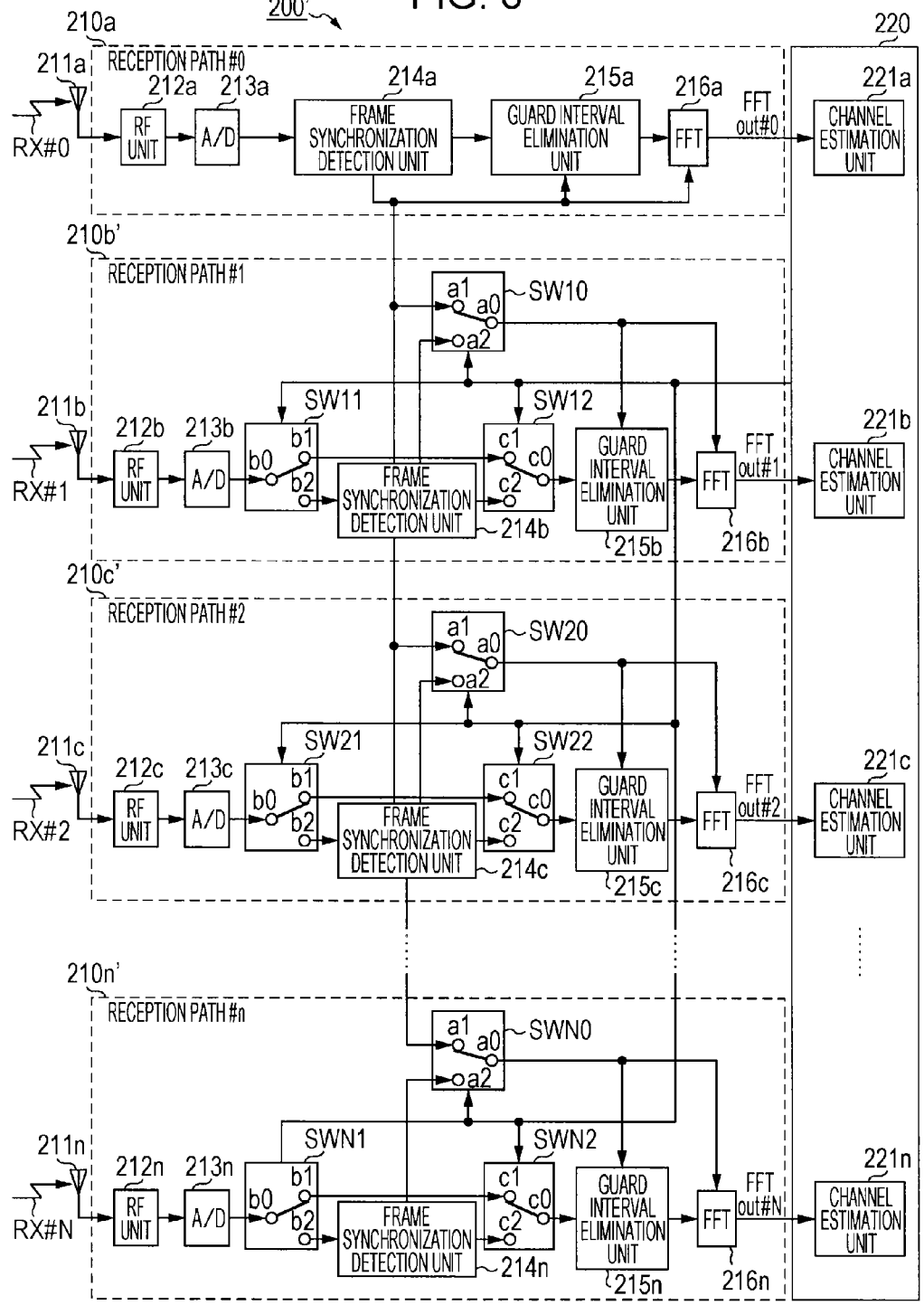
FIG. 8 is a block diagram illustrating an exemplary MIMO reception device (an example where switching is enabled) according to an embodiment of the present disclosure.

FIG. 8 illustrates the configuration of a different MIMO reception device 200'.

The MIMO reception device 200' of an example of FIG. 8 enables switching between reception processing performed when the preamble signal is transmitted by only one of the signals of plural paths and reception processing performed when the preamble signal is transmitted by each transmission signal.

In the MIMO reception device 200' illustrated in FIG. 8, the same parts as those of the MIMO reception device 200 illustrated in FIG. 7 are designated by the same reference signs.

The reception path 210a designated by #0 is the same as the MIMO reception device 200 illustrated in FIG. 7. The reception paths 210b' to 210n' designated by #1 to #n separately include frame synchronization detection units 214b to 214n, respectively. The frame synchronization detection units 214b to 214n detect the preamble signals from the respective reception signals RX#1 to RX#n, and acquire frame synchronization signals.

In the preceding and subsequent stages of the frame synchronization detection units 214b to 214n, selector switches SW11 to SWN1, and SW12 to SWN2 are connected, respectively. The connection of the selector switches SW11 to SWN1, and SW12 to SWN2 allows the reception paths 210b to 210n designated by #1 to #n to select a path where the preamble signal is detected and a path where the preamble signal is not detected with the frame synchronization detection units 214b to 214n.

Further, the reception paths 210b' to 210n' designated by #1 to #n include selector switches SW10, SW20, . . . and SWN0. The selector switches SW10 to SWN0 perform switching between a frame synchronization signal detected with the frame synchronization detection unit 214a of the reception path 210a designated by #0 and frame synchronization signals that are detected with the frame synchronization units 214b to 214n of the reception paths 210b' to 210n' designated by #1 to #n.

Then, frame synchronization signals that are selected with the individual selector switches SW10 to SWN0 are supplied to the guard interval elimination units 215b to 215n and the FFT units 216b to 216n of the reception paths 210b' to 210n'.

Each of the selector switches SW10 to SWN0, SW11 to SWN1, and SW12 to SWN2 performs switching based on, e.g., the mode of a reception signal. For example, when the preamble signal is included in the transmission signal of a single path illustrated in FIG. 6, switching is performed to use only the frame synchronization detection unit 214a of the reception path 210a designated by #0. Further, when the preamble signal is included in the transmission signal of every path, frame synchronization signals that are detected with the individual frame synchronization units 214b to 214n are used on the reception paths 210b to 210n designated by #1 to #n.

According to the MIMO reception device 200' illustrated in FIG. 8, it becomes possible to deal with either the case where a signal having the preamble signal included in only one of the plural paths is received or the case where the preamble signal is included in every reception signal. However, even if the preamble signal is included in every reception signal, synchronization processing may be performed for each of the reception paths through the use of the preamble signal detected from the reception signal of a single path.

5. EXAMPLE OF FRAME SYNCHRONIZATION UNIT

Figure 9:
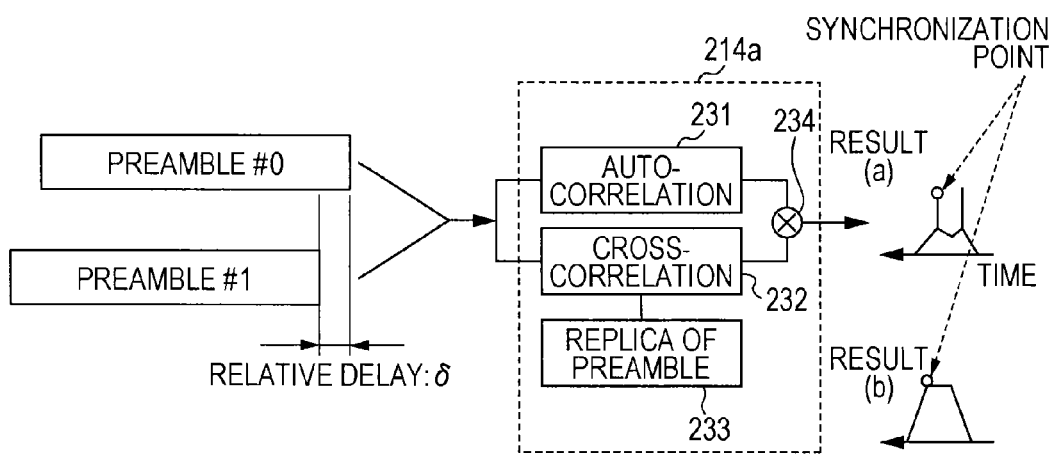
FIG. 9 is a configuration diagram illustrating an exemplary frame synchronization unit according to an embodiment of the present disclosure.

FIG. 9 is a diagram illustrating a configuration for detecting the preamble signal through correlation detection performed with the frame synchronization detection unit 214a illustrated in FIG. 7 and FIG. 8.

Here, the assumption is made that the preamble signal of the path #0 and the preamble signal of the path #1 are included in a reception signal. A relative delay δ occurs between the two signals.

As illustrated in FIG. 9, the frame synchronization detection unit 214a includes an auto-correlation operation unit 231 and a cross-correlation operation unit 232. The auto-correlation operation unit 231 calculates the auto-correlation of a received preamble signal. The cross-correlation operation unit 232 calculates the cross correlation between a received preamble signal and a replica held by a preamble replica holding unit 233.

Then, the individual correlation values are multiplied with a multiplier 234, and a frame synchronization signal is acquired based on a value obtained by multiplying the correlations by each other.

When acquiring the frame synchronization signal based on the correlation value in the past, a frame synchronization signal having the peak position where the multiplication value is maximized to be the synchronization point is acquired.

In the frame synchronization detection unit 214a of the present disclosure, the earliest detected peak position among plural peak positions that are acquired based on the multiplication value is determined to be the synchronization point as illustrated in FIG. 9 as result (a). Then, a frame synchronization signal indicating the synchronization point is generated.

Here, when the preamble signal is included only in the signal of a single path as illustrated in FIG. 6, a single peak position based on the preamble signal is detected as illustrated in FIG. 9 as result (b). The frame synchronization detection unit 214a of the present disclosure determines the single peak position (the first peak position) to be the synchronization point, and generates a frame synchronization signal indicating the synchronization point.

By thus determining the first detected peak position to be the synchronization point and performing the reception processing for every reception path based on the frame synchronization signal indicating the synchronization point, an intersymbol interference occurring in the tail part of a signal having been subjected to the guard interval elimination can be avoided and the orthogonality between subcarriers after fast Fourier transform can be retained.

6. EXAMPLE OF CHANNEL ESTIMATION

Next, a channel estimation according to an example of the present disclosure will be described with reference to FIG. 10 and FIG. 11. For performing the MIMO reception, there is a necessity to obtain a channel matrix (H-matrix) to separate the reception data of each channel.

On this account, pilot signals are transmitted from the MIMO transmission device. The pilot signals are arranged from individual transmission antennas in individual signals that are usually OFDM modulated so as not to overlap in terms of the time and the frequency range.

Figure 10:
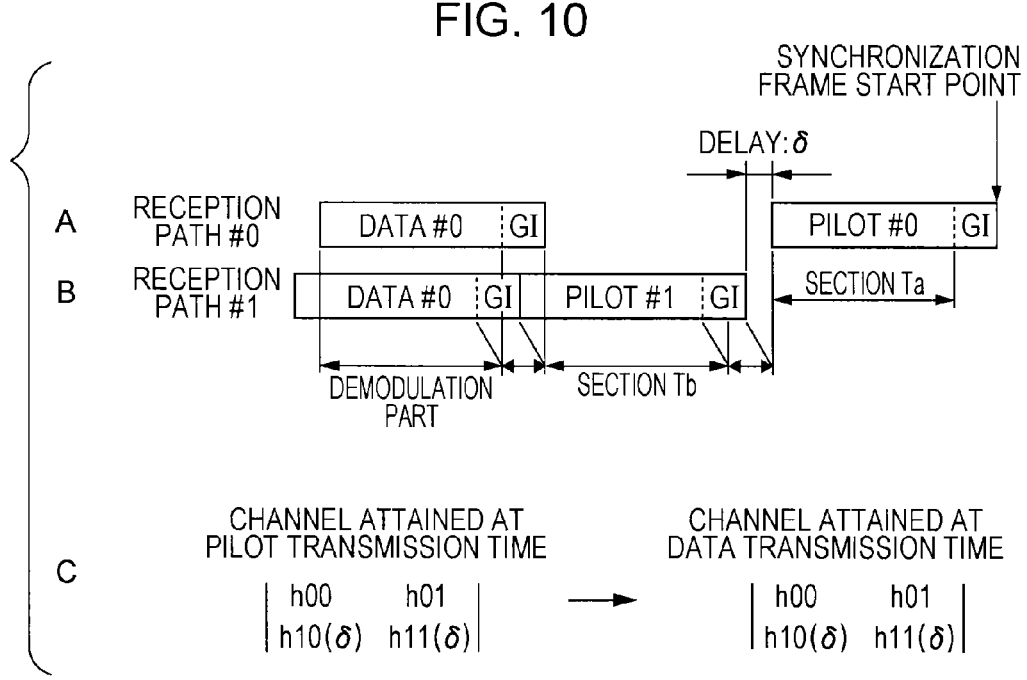
FIG. 10 is a diagram illustrating an exemplary channel estimation according to an embodiment of the present disclosure.

For example, as illustrated in FIG. 10, upon receiving the reception signal of the path #0 (Part A of FIG. 10) and the reception signal of the path #1 (Part B of FIG. 10), the pilot signals that are arranged in sections except the guard intervals (GI) are set in timings that are different from each other. In this example of FIG. 10, the relative delay δ occurs between the two reception signals. The relative delay δ is smaller than the length of the section of the guard interval (GI).

Under these circumstances, elements h00 and h01 of (the H-matrix) are obtained based on the pilot signal of the path #0, and elements h10 and h11 of (the H-matrix) are obtained based on the pilot signal of the path #1 as illustrated in FIG. 10C. Here, the relative delay δ exists between the two reception signals as illustrated in parts A and B of FIG. 10.

In an example of the present disclosure, synchronization acquisition processing is performed with the single frame synchronization detection unit 214a as illustrated in FIG. 7, and a synchronization frame start point is set based on the reception data of the path #0 and fast Fourier transform is executed on each reception path as illustrated in part A of FIG. 10. That is, every reception path executes the fast Fourier transform based on a transmission section Ta of the pilot signal illustrated in part A of FIG. 10.

Accordingly, on the reception path 210b designated by #1, the pilot signal of the elements of the H-matrix is detected from the result of subjecting the signal of a transmission section Tb displaced from the transmission section Ta by one OFDM frame to the fast Fourier transform, as illustrated in part B of FIG. 10. That is, the relative delay δ is added to the elements h10 and h11 of the (H-matrix), which are obtained based on the pilot signal of the path #1, as illustrated in part C of FIG. 10.

Therefore, although the fast Fourier operation is performed while the relative delay δ is still included, the orthogonality is not disturbed by an operation by the fast Fourier transform as long as the relative delay δ falls within the length of the guard interval.

Then, when the channel estimation is performed for the H-matrix, the estimation of the H-matrix is performed while the relative delay δ is still included, as illustrated in part C of FIG. 10, which means that each of subcarrier components of the pilot signal after the fast Fourier transform includes phase rotation caused by the relative delay δ. Accordingly, data is properly restored when both the pilot signal and the data have the same relative delay.

Figure 11A:
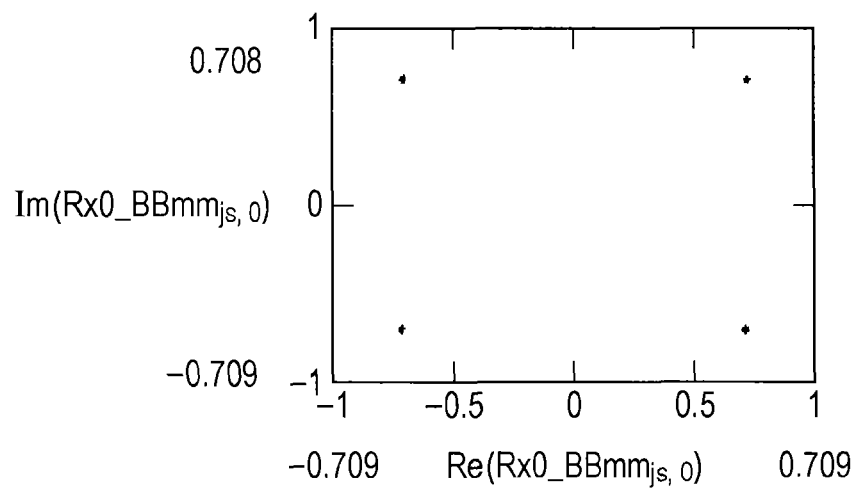
FIGS. 11A and 11B are diagrams illustrating exemplary transmission states according to an embodiment of the present disclosure.
Figure 11B:
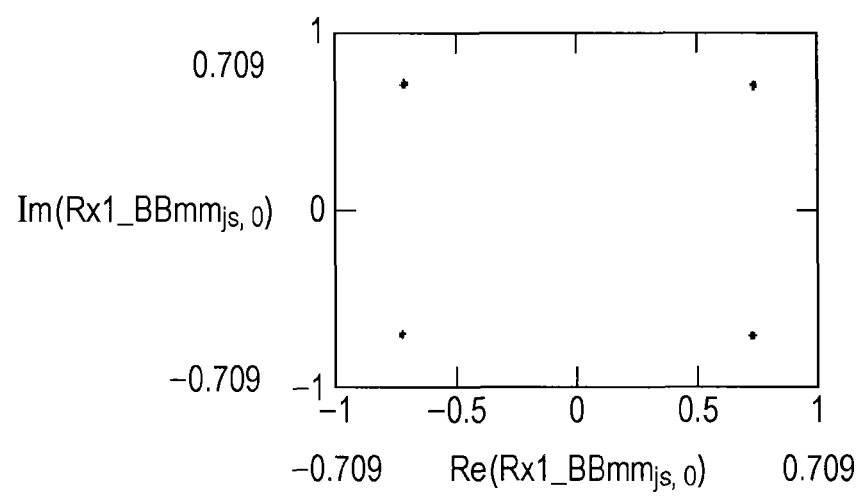

FIGS. 11A and 11B are examples where a result of demodulating reception data of the path #0 (FIG. 11A) and that of demodulating reception data of the path #1 (FIG. 11B) are simulated. The simulation of the example of FIG. 11 is performed on condition that the relative delay δ is approximately 3.2 nsec which corresponds to one-tenth of an FFT slot of the LTE standard. Further, a Rayleigh fading environment is envisioned. That is, a hundred scattered points are randomly arranged around a reception point, about 50 m in circumference, variations in phase and amplitude, which are caused by scattering from the scattered points, become random, and ray tracing is used to achieve propagation from the scattered points. As for a signal, QPSK-OFDM is used.

FIG. 11A and FIG. 11B illustrate the constellations of two receptions, which are achieved after signals are separated from the obtained H-matrix. It is apparent that both the constellations are restored. Here, it should be noted that the amount of restorable delay falls within the guard interval length.

For example, even though the guard interval length is set to about 5 psec according to the LTE standard, the relative delay δ that actually occurs is about 10 nsec. Therefore, the reception device can perform processing properly.

As described above, according to the present disclosure, the frame synchronization detection unit 214a is provided for only one of the plural reception paths of the MIMO reception device so that the effect of a displacement of the synchronization point, which is caused by a displacement of the reception time of each reception path, can be eliminated. Therefore, even if the signal of each path, which is transmitted from the MIMO transmission device, has a relative delay, the reception processing can be performed properly. Accordingly, the plural transmission paths of the MIMO transmission device are allowed to perform transmission with a relative delay to some extent, and the MIMO transmission device can be easily configured as a result.

Further, in the MIMO reception device of the present disclosure, there is no need to provide the frame synchronization unit for each of the reception paths, and the configuration of the reception device can be simplified accordingly.

7. EXAMPLE OF MODIFICATIONS

According to the above description, the MIMO transmission device is configured so that the preamble signal is only provided in the transmission signal of a single path, which has the smallest relative delay among the plural transmission signals, and no preamble signal is provided in the transmission signals of the other paths as illustrated in FIG. 6.

On the other hand, it may be arranged such that the preamble signal is provided in each of plural signals that are transmitted from the MIMO transmission device to the MIMO reception device 200 illustrated in FIG. 7.

That is, even though the preamble signal is included in a reception signal, the reception paths 210b to 210n designated by #1 to #n, which are included in the reception paths 210a to 210n designated by #0 to #n, which are provided in the MIMO reception device 200 illustrated in FIG. 7, do not perform the synchronization detection processing.

Thus, even though the preamble signal is provided in each of the plural signals, the reception processing can be properly performed by executing the synchronization processing on each reception path based on a frame synchronization signal detected from the earliest transmitted preamble signal on the reception side. Accordingly, the MIMO reception device 200 illustrated in FIG. 7 can be applied even though no special processing is performed on the transmission side, and contributes to the simplification of a MIMO reception device designed for a system performing communications by applying existing MIMO technologies.

Further, the MIMO reception device of the present disclosure can be applied to a reception device applied to a multiuser MIMO (MU-MIMO) where plural terminals are provided on the transmission side.

The present disclosure may have the following configurations.

(1)
A communication system wherein a preamble signal is added to a transmission signal transmitted in an earliest timing among transmission signals that are modulated under an OFDM scheme, the transmission signals being output from individual transmission antennas under an MIMO scheme; and
wherein the preamble signal is not added to the transmission signals except the transmission signal transmitted in the earliest timing.

(2)
The communication system according to (1),
wherein, in the transmission signals except the transmission signal transmitted in the earliest timing, a null signal is provided in a section of the preamble signal.

(3)
The communication system according to (1) or (2),
wherein a reception device receiving the transmission signal determines a frame synchronization signal acquired based on the preamble signal received by a first reception antenna among plural reception antennas to be a synchronization acquisition signal, and uses the acquired synchronization acquisition signal to perform frame synchronization processing for a signal received by each of the reception antennas.

(4)
A communication device comprising:
a transmission signal processing unit that adds a preamble signal to a transmission signal transmitted in an earliest timing among plural transmission signals that are modulated under an OFDM scheme, the transmission signals being simultaneously transmitted under a MIMO scheme, and that does not add the preamble signal to the other transmission signals; and
transmission antennas that separately transmit plural transmission signals that are generated with the transmission signal processing unit.

(5)
A reception device comprising:
plural reception antennas that receive plural signals that are modulated under an OFDM scheme, the signals being simultaneously transmitted under a MIMO scheme;
a synchronization processing unit that determines a frame synchronization signal acquired based on a preamble signal included in a specific reception signal received in an earliest timing among the signals that are received by the plural reception antennas to be a synchronization acquisition signal; and
a reception processing unit that performs frame synchronization processing for a signal received by each of the reception antennas based on the synchronization acquisition signal acquired with the synchronization processing unit.

(6)
The reception device according to (5),
wherein the reception processing unit selects a case where the frame synchronization signal acquired based on the preamble signal included in the specific reception signal is used as the synchronization acquisition signal of each of the reception signals or a case where a frame synchronization signal acquired based on a preamble signal included in a signal received by a reception antenna of each system is used as the synchronization acquisition signal.

In addition, the configurations or the processing procedures that are written in Claims of the present disclosure are not limited to the above-described exemplary embodiments. It should be understood by those skilled in the art that various modifications, combinations, and other exemplary embodiments may occur depending on design and/or other factors insofar as they are within the scope of the claims or the equivalents thereof, as a matter of course.

REFERENCE SIGNS LIST 11a, 11b: antenna, 12a, 12b: high frequency unit (RF unit), 13a, 13b: analog-to-digital converter, 14a, 14b: matched filter, 15: correlation detection unit, 16a, 16b: guard interval elimination unit, 17a, 17b: FFT unit, 18: reception data processing unit, 100: MIMO transmission device, 101: transmission data processing unit, 102a, 102b, 102c: IFFT unit, 103a, 103b, 103c: digital-to-analog converter, 104a, 104b, 104c: high frequency unit (RF unit), 105a, 105b, 105c: antenna, 200, 200': MIMO reception device, 210a to 210n: reception path, 211a to 211n: antenna, 212a to 212n: RF unit, 213a to 213n: analog-to-digital converter, 214a to 214n: frame synchronization unit, 215a to 215n: guard interval elimination unit, 216a to 216n: FFT unit, 220: reception data processing unit, 221a to 221n: channel estimation unit, 231: auto-correlation operation unit, 232: cross-correlation operation unit, 233: preamble replica holding unit, 234: multiplier

What is claimed is:

1. A communication system comprising:
a transmission device having a plurality of transmission antennas that transmit a plurality of signals, as transmission signals, under a multiple input multiple output (MIMO) scheme, the plurality of signals being transmitted with a relative delay to one another and being modulated and multiplexed together under an orthogonal frequency division multiplexing (OFDM) scheme; and
a reception device having a plurality of reception antennas that receive the plurality of signals under the MIMO scheme,
wherein the transmission device is configured to add a preamble signal to one of the transmission signals transmitted to the reception device at an earliest timing among the transmission signals, the transmission signals being output from the transmission antennas;
wherein the transmission device does not add the preamble signal to the transmission signals other than the transmission signal transmitted at the earliest timing,
wherein the reception device is configured to detect whether the preamble signal has only been added to the transmission signal transmitted at the earliest timing among the transmission signals, and
wherein the reception device determines a frame synchronization signal acquired from only the preamble signal received by a first reception antenna among the plurality of reception antennas to be a synchronization acquisition signal, and uses the acquired synchronization acquisition signal to perform frame synchronization processing for a signal received by each of the reception antennas, when the reception device detects that the preamble signal has only been added to the transmission signal transmitted at the earliest timing among the transmission signals.

2. The communication system according to claim 1, wherein, in the transmission signals other than the transmission signal transmitted at the earliest timing, a null signal is provided instead of the preamble signal.

3. A communication method comprising:
adding, using processing circuitry, a preamble signal to a transmission signal transmitted in an earliest timing among plural transmission signals that are modulated and multiplexed together under an orthogonal frequency division multiplexing (OFDM) scheme, and to not add the preamble signal to the other transmission signals; and
transmitting, using a plurality of transmission antennas, separately and respectively with a relative delay to one another the plural transmission signals that are generated with the processing circuitry, under a multiple input multiple output (MIMO) scheme;
receiving, by a reception device, the plural transmission signals to determine a frame synchronization signal acquired from only the preamble signal included in the transmission signal transmitted at the earliest timing, and received by a first reception antenna among a plurality of reception antennas at the reception device, to be an acquired synchronization acquisition signal;
detecting, by the reception device, whether the preamble signal has only been added to the transmission signal transmitted at the earliest timing among the transmission signals; and
using, by the reception device, the acquired synchronization acquisition signal to perform frame synchronization processing for a signal received by each of the reception antennas when the reception device detects that the preamble signal has only been added to the transmission signal transmitted at the earliest timing among the transmission signals.

4. A reception device comprising:
a plurality of reception antennas that receive plural signals that are modulated and multiplexed together under an orthogonal frequency division multiplexing (OFDM) scheme, the signals being transmitted with a relative delay to one another under a multiple input multiple output (MIMO) scheme; and
processing circuitry configured to
determine a frame synchronization signal acquired based on a preamble signal included in a specific reception signal received at an earliest timing by a first reception antenna among the signals that are received by the plurality of reception antennas to be an acquired synchronization acquisition signal,
detect whether the preamble signal has only been added to the specific reception signal received at the earliest timing by the first reception antenna among the signals received by the plurality of reception antennas,
perform frame synchronization processing for the signal received by each of the reception antennas based on the acquired synchronization acquisition signal, and
wherein the processing circuitry determines the acquired synchronization acquisition signal from only the preamble signal received by the first reception antenna among the plurality of reception antennas, and uses the acquired synchronization acquisition signal to perform frame synchronization processing for the signal received by each of the reception antennas, when the processing circuitry detects that the preamble has only been added to the specific reception signal.

5. The communication system according to claim 1, wherein the transmission device is a mobile terminal and the transmission signals are uplink transmission signals.

* * * * *